H. A. SELAH.
MAGNETIC ROTARY METER.
APPLICATION FILED NOV. 18, 1909.
1,016,964.
Patented Feb. 13, 1912.
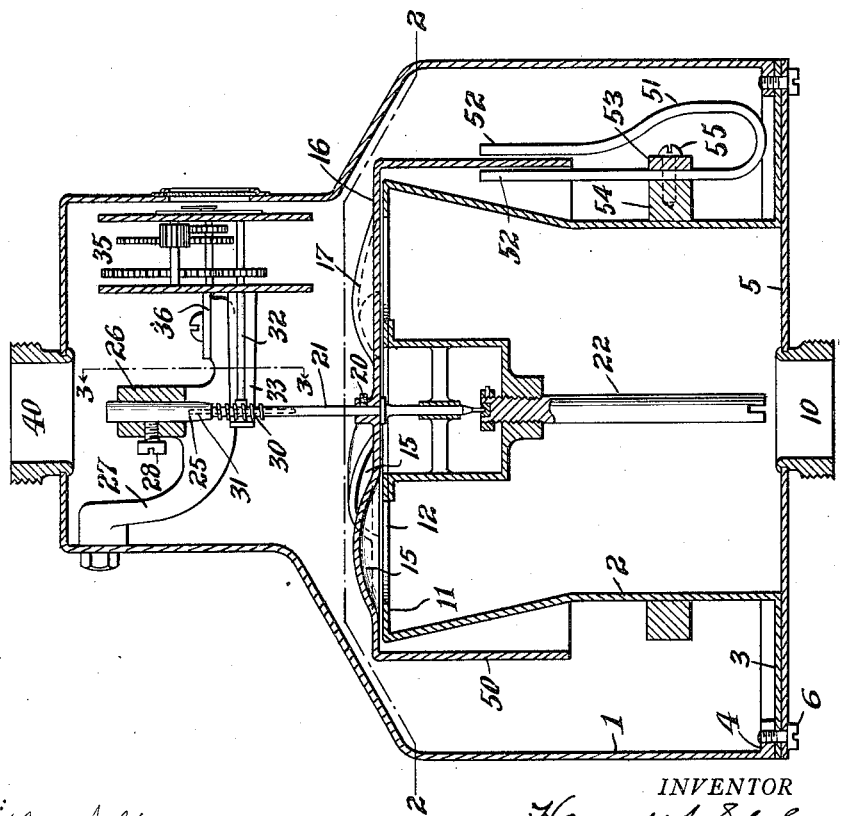

UNITED STATES PATENT OFFICE.

HOWARD A. SELAH, OF PHILADELPHIA, PENNSYLVANIA, ASSIGNOR, BY DIRECT AND MESNE ASSIGNMENTS, TO CYRUS N. ANDERSON, TRUSTEE, OF PHILADELPHIA, PENNSYLVANIA.

MAGNETIC ROTARY METER.

1,016,964.  Specification of Letters Patent.  Patented Feb. 13, 1912.

Application filed November 18, 1909. Serial No. 528,721.

*To all whom it may concern:*

Be it known that I, HOWARD A. SELAH, a citizen of the United States, residing in Philadelphia, county of Philadelphia, State of Pennsylvania, have invented certain new and useful Improvements in Magnetic Rotary Meters, of which the following is a specification.

My invention relates to magnetic rotary meters, and it has for its object to provide a rotary meter having means whereby its accuracy is greatly enhanced.

One embodiment of my invention is illustrated in the accompanying drawings but it is to be understood that changes in the details of construction and in the arrangement of the mechanical parts entering into said construction may be varied without departing from the scope of my invention as the same is set forth in the specification and claims.

In the drawings: Figure 1 is a longitudinal sectional elevation of a rotary meter provided with my invention; Fig. 2 is a transverse sectional plan taken on the line 2—2 of Fig. 1; and Fig. 3 is a section taken on the line 3—3 of Fig. 1.

Referring to the drawings:—1 designates an outside casing or chamber and 2 designates an interior casing or chamber. The interior casing 2 is provided with an outwardly turned flange 3 on which rests an inturned flange 4 at the lower edge of the exterior casing 1. The base of the interior casing 2 is closed by means of a plate 5 which is co-extensive with the exterior casing 1 and is secured to the latter and to the interior casing 2 by means of screws 6 which pass through the said plate and through the flanges 3 and 4 of the interior and exterior casings or chambers.

The gas or other fluid which is to be measured by the meter enters the interior casing 2 through a port 10 in the plate 5. The top 11 of the interior casing or chamber 2 is provided with openings 12 through which the fluid passes on its way to the exterior casing or chamber 1. In passing from the interior to the exterior casing or chamber the gas or other fluid is directed through openings 15 in a revoluble plate or disk 16 which I designate as a turbine wheel. The material adjacent to each of the said openings 15 is upset as indicated at 17 in the drawings and is inclined as indicated. The raised or upset portions 17 are each located on the same side of the respective openings and are inclined in the same direction so that the passage of the gas or other similar fluid through the said openings and the striking of the same against the inclined surfaces of the said raised or upset portions 17 cause revolution of the disk or plate 16 which latter is secured by means of a screw 20 to the shaft 21. The lower end of the shaft rests upon a jewel bearing in the upper end of an adjustable screw bolt 22. The upper end of the shaft 21 is supported in an adjustable bearing 25 secured in the cross member 26 of a bracket 27 by means of a screw 28. The shaft 21 is provided with a worm gear 30 which engages a gear wheel 31 mounted on a shaft 32 one end of which is journaled in a bracket 33 and the other end portion of which extends into and forms a part of the dial mechanism 35 of the meter. The dial mechanism is of any known construction and will not be described in detail. The dial mechanism is supported upon the bracket 27 by means of a plate 36 which is secured to a member of the dial mechanism and to the said bracket. The gas in passing from the interior casing or chamber 2 to the casing or chamber 1 and thence outwardly through the port or opening 40 occasions revolution of the plate or disk 16 and but for the presence of some retarding means or device the said disk would continue to rotate after the cessation of the flow of gas or other fluid through the openings in the said plate or disk 16. Such action would occasion the rotation of the shaft 21 and consequent actuation of the measuring mechanism 35 during a considerable period when no gas would be actually flowing through the chambers 2 and 1. It is apparent, therefore, that in order to construct a rotary meter which would accurately and exactly measure the amount of gas or similar fluid which may flow through a pipe for any purpose, it is necessary that the disk or other means employed for actuating the dial mechanism employed to indicate the quantity of gas which has been used or which has passed a certain point shall have some means associated therewith for causing a cessation of its revolution or other movement immediately upon the cessation of the flow of gas or other fluid. To accomplish this result I have provided the disk or plate 16 with a flange or apron 50 which extends into the field of a magnet. In the construction illustrated the magnet 51 is permanent and is bent as indicated so that the poles 52 are relatively close together. The magnet is adjustably supported between a bar member 53 and a base or support 54 secured to the interior casing or chamber 2,—the part 53 being secured to the base or support 54 by means of screws 55 (one of which only is shown) located upon opposite sides of the magnet. The magnet may be supported in any other manner which may be desired or preferred. The flange or apron 50 extends between the poles 52 of the magnet and as will be understood the retardation of rotation or revolution of the disk 16 by the magnet may be varied by relative adjustment between the magnet and the said flange or sleeve. In the construction shown the magnet only is made adjustable. By raising the said magnet so as to bring a larger proportion of the flange or apron 50 between the poles 52 the retardation is increased and by lowering the magnet the retardation is decreased.

I have found that by the use of a retarding device such as the magnet which I have illustrated, I am enabled to produce a meter which will measure very accurately the amount of gas which flows through a pipe or similar passage way. As thus far tested I have found that a meter provided with a retarding device such as I have illustrated will indicate within less than one per cent. the amount of gas which passes through a pipe or through passage way even though the flow of gas be interrupted with more or less frequency. As far as I am aware no other rotary meter has ever been constructed which would measure or indicate with any degree of accuracy the amount of gas passed through a pipe when the flow of gas was interrupted at intervals.

It will be understood that the number of magnets employed for the purpose of controlling the revoluble disk 16 may be varied without departing from my invention.

Having thus described my invention, I claim:—

1. In a rotary gas meter, the combination of a turbine member actuated by the flow of gas therethrough, registering mechanism actuated by the said turbine member, and a magnetic device operating as a retarder upon the said turbine member.

2. In a rotary gas meter, the combination of a disk having openings therethrough and the said disk having inclined portions adjacent to the said openings upon which the gas or other fluid passing through the meter impinges and thereby causes the rotation of the said disk, mechanism having operative connection with the said disk for indicating the quantity of gas or other fluid which passes through the said meter, and a magnetic device associated with the said disk for retarding the movement thereof.

3. In a rotary meter, the combination of a rotary gas member and magnetic means, the said member having a portion which projects into the field of the said magnetic means, and also having a portion provided with openings and with hoods extending over said openings against which the gas impinges to cause rotation of said member.

4. In a rotary gas meter, the combination of a magnet having its poles located adjacent to each other, a rotary disk having a flange which projects into the magnetic field between the said poles and also having hooded openings and the rotation of the said disk being caused by the impingement of gas upon the hoods, the said magnet and the said disk being relatively adjustable, and mechanism having operative connection with the said disk whereby the rotation of the latter causes operation of the said mechanism to indicate the quantity of gas or other fluid which passes through the meter.

5. In a rotary gas meter, the combination of an external chamber, an internal chamber, a rotary disk located above the internal chamber, the said disk having means whereby the passage of a gas or similar fluid through the said meter occasions rotation of the said disk, and the said disk having a flange, a magnet into the field of which the said flange projects, a shaft to which the said rotary disk is secured, and mechanism actuated by said shaft to indicate the quantity of gas or similar fluid which passes through the said meter.

6. In a rotary gas meter, the combination of a rotatable turbine member and a magnet, the said turbine having a flange which projects into the field of the said magnet and also having openings therethrough with hoods extending thereover, the rotation of said turbine member being caused by the impingement of gas upon said hoods.

7. In a rotary gas meter, the combination of a turbine member, registering mechanism actuated by the said turbine member and a magnet, the said turbine member having a portion which projects into the field of the said magnet and also having openings therethrough with hoods extending thereover, the rotation of said turbine member being caused by the impingement of gas upon said hoods.

In testimony that I claim the foregoing as my invention, I have hereunto signed my name this 16th day of November, A. D. 1909.

HOWARD A. SELAH.

In the presence of—
S. SALOME BROOKE,
CARRIE E. KLEINFELDER.

Copies of this patent may be obtained for five cents each, by addressing the "Commissioner of Patents, Washington, D. C."